(12) United States Patent
Hartung-Rey

(10) Patent No.: US 11,802,550 B2
(45) Date of Patent: Oct. 31, 2023

(54) DISPLACEMENT METERING PUMP AND USE OF THE DISPLACEMENT METERING PUMP

(71) Applicant: INDAG POUCH PARTNERS GMBH, Eppelheim (DE)

(72) Inventor: Soenke Hartung-Rey, Heidelberg (DE)

(73) Assignee: INDAG POUCH PARTNERS GMBH, Eppelheim (DE)

( * ) Notice: Subject to any disclaimer, the term of this patent is extended or adjusted under 35 U.S.C. 154(b) by 0 days.

(21) Appl. No.: 17/271,184

(22) PCT Filed: Aug. 12, 2019

(86) PCT No.: PCT/EP2019/071532
§ 371 (c)(1),
(2) Date: Feb. 24, 2021

(87) PCT Pub. No.: WO2020/043471
PCT Pub. Date: Mar. 5, 2020

(65) Prior Publication Data
US 2021/0246888 A1    Aug. 12, 2021

(30) Foreign Application Priority Data
Aug. 29, 2018  (EP) ..................... 18191471

(51) Int. Cl.
*F04B 15/02* (2006.01)
*F04B 13/00* (2006.01)

(52) U.S. Cl.
CPC .............. *F04B 15/02* (2013.01); *F04B 13/00* (2013.01)

(58) Field of Classification Search
CPC .... F04B 9/02; F04B 9/04; F04B 9/042; F04B 9/045; F04B 9/047; F04B 13/00;
(Continued)

(56) References Cited

U.S. PATENT DOCUMENTS 3,052,381 A * 9/1962 Carpigiani ............. A23G 9/281
222/144.5
4,711,376 A * 12/1987 Manfroni ............... A23G 9/281
99/452
2004/0208750 A1* 10/2004 Masuda ................ F04B 53/102
417/42
(Continued)

FOREIGN PATENT DOCUMENTS

EP    2160965 A1    3/2010
EP    1501755 B1    11/2012
(Continued)

OTHER PUBLICATIONS

Japanese Patent Office, Office Action Issued in Application No. 2021-536151, dated Feb. 8, 2022, 10 pages.
(Continued)

*Primary Examiner* — Charles G Freay
*Assistant Examiner* — Chirag Jariwala
(74) *Attorney, Agent, or Firm* — McCoy Russell LLP

(57) ABSTRACT

In a displacement metering pump, comprising a cylinder housing, which has a product inlet and a product outlet and in which a sealed displacement piston can be moved back and forth, the cylinder housing, with a piston rod seal fixedly installed therein for the displacement piston forming a piston rod and with the placement of the product inlet and the product outlet, has no dead space and is self-emptying, i.e. can be flawlessly cleaned with respect to CIP hygiene.

12 Claims, 2 Drawing Sheets

(58) Field of Classification Search
CPC .......... F04B 15/00; F04B 15/02; F04B 15/04; F04B 19/00; F04B 19/04; F04B 19/20; F04B 19/22; A23G 9/28; B67D 3/00; B67D 3/04; B67D 3/043; B67D 3/0041; B67D 3/0045
See application file for complete search history.

(56) References Cited

U.S. PATENT DOCUMENTS

| | | | | |
|---|---|---|---|---|
| 2011/0229608 | A1* | 9/2011 | Plessier | A23G 9/506 426/100 |
| 2013/0064034 | A1* | 3/2013 | Almblad | A23G 9/28 366/205 |
| 2015/0086386 | A1* | 3/2015 | Moskal | F04B 49/12 417/538 |
| 2017/0217614 | A1* | 8/2017 | Franz | B65B 39/003 |

FOREIGN PATENT DOCUMENTS

| | | | | |
|---|---|---|---|---|
| EP | 2708141 A1 * | 3/2014 | | A23G 9/12 |
| EP | 2949930 A1 | 12/2015 | | |
| JP | S5318780 A | 2/1978 | | |
| WO | WO-9516134 A1 * | 6/1995 | | A23G 9/28 |
| WO | 2011043784 A1 | 4/2011 | | |
| WO | 2017118527 A1 | 7/2017 | | |

OTHER PUBLICATIONS

ISA European Patent Office, International Search Report Issued in Application No. PCT/EP2019/071532, dated Oct. 31, 2019, WIPO, 5 pages.

* cited by examiner

DISPLACEMENT METERING PUMP AND USE OF THE DISPLACEMENT METERING PUMP

CROSS REFERENCE TO RELATED APPLICATIONS

The present application is a U.S. National Phase of International Application No. PCT/EP2019/071532 entitled "DISPLACEMENT METERING PUMP AND USE OF THE DISPLACEMENT METERING PUMP," and filed on Aug. 12, 2019. International Application No. PCT/EP2019/071532 claims priority to European Patent Application No. 18191471.4 filed on Aug. 29, 2018. The entire contents of each of the above-listed applications are hereby incorporated by reference for all purposes.

TECHNICAL FIELD

The invention relates to a displacement metering pump and its use.

BACKGROUND AND SUMMARY

It is well-known to use, among other things, displacement metering pumps for the discontinuous volumetric metering of liquid to pasty products which are partially additionally loaded with solid matter, e. g. in the food or beverage industry. These displacement metering pumps operate with pistons or piston-membrane combinations, hoses or the like. Disadvantages of known displacement pumps of this principle are that these are not self-emptying and free of dead space at the same time. A dead space is defined, according to DIN EN 1672-2, as a space where a product, ingredients, cleaning agents or disinfectants or impurities are contained, retained, or from which they cannot be removed completely by cleaning measures. If the dead space is located in the cylinder housing carrying the product above the highest product inlet or outlet, even air may be contained therein, apart from the media mentioned in DIN EN 1672-2. Due to the compressibility of air, metering accuracy is impacted thereby. Moreover, an air cushion may occur which prevents complete rinsing during CIP cleaning (cleaning in place). Therefore, these pumps are in most cases employed for hot metering, such that the product provides a sterilization effect, however not for cold metering as then, germination cannot be reliably excluded. Thus, the mentioned displacement metering pumps do not meet prescribed hygienic demands for food machines, e. g. in Germany according to DIN EN 1672-2.

A displacement metering pump employed in praxis by the applicant comprises the product inlet and the product outlet at the same level in the upper end of the cylinder housing within the cylinder housing that is installed essentially vertically in the operating position. The displacement piston is inserted in the lower end of the cylinder housing and has a piston ring-type piston seal that seals at the inner wall of the cylinder housing also when the displacement piston is moved. The cylinder housing is divided into a head part and a bottom part which are connected via a flange joint with an inserted seal. In the vicinity of the displacement piston, there is a not self-emptying dead space in the cylinder housing in which flushed-in solid matter cannot be removed by CIP cleaning and will accumulate. In the region of the flange joint, there is an undercut in which impurities may deposit. Moreover, the flange joint cannot be traversed with the piston seal of the displacement piston. Finally, above the product inlet and product outlet, too, there is a dead space. Due to this structural concept, the displacement metering pump is not self-emptying and requires hot metering.

The object underlying the invention is to provide a displacement metering pump of the type mentioned in the beginning which easily meets hygienic demands for food machines, ensures exact discontinuous volumetric metering, and is thus usable both for hot and cold metering.

The set object is achieved with the features of patent claim 1 disclosed and the use according to the methods described herein.

Due to the displacement piston immersing into the cylinder housing from above, which piston is embodied without movable piston seal and as a piston rod, and which is sealed in the piston rod seal fixedly installed in the cylinder housing, and with a corresponding placement of the product inlet and the product outlet, a self-emptying displacement metering pump that has no dead space can be surprisingly created. The displacement metering pump meets the standardized hygienic demands for food machines, e. g. according to DIN EN 1672-2, ensures precise metering due to the elimination of an air cushion, and can also be used for cold metering.

Suitably, the cylinder housing with the displacement piston immersing into the cylinder housing from above can be flawlessly cleaned with respect to CIP hygiene, preferably via the product inlet located at the top and the product outlet located at the bottom.

Here, the product inlet is suitably arranged laterally at the upper end of the cylinder housing at the piston rod seal, and the product outlet is arranged at the lower end of the cylinder housing when installed in an essentially vertical operating position. This concept avoids non-cleanable dead spaces, and also a dead space where an air cushion may be maintained, and results in a self-emptying function. By CIP cleaning, all surfaces of the displacement metering pump contacted by the product may be flawlessly cleaned, and the cleaning medium may drain automatically and discharge all impurities.

In view of avoiding dead spaces, it is suitable for the cylinder axis of the cylinder housing to be inclined with respect to a vertical line in the operating position of the displacement metering pump, preferably relative to the product inlet at an angle of about 30°, such that the highest point of the product inlet is essentially in or at the highest point of the interior of the cylinder housing 1.

In one embodiment, the cylinder housing is divided, via a sealed flange joint, into a head part comprising the piston rod seal and the product inlet, and a coaxial bottom part with a cylinder section and a terminal outlet funnel ending in the product outlet. In particular the outlet funnel causes a gradual acceleration either of the product during the movement of the displacement piston, promoting exact metering, or of a cleaning medium in a swift cleaning cycle.

It is moreover beneficial for the diameter of the displacement piston to be smaller than the internal diameter at least of the head part of the cylinder housing, such that the displacement piston does not contact the inner wall of the cylinder housing and may even traverse the flange joint without any risks.

Suitably, the piston rod seal is a slide bush fixed in a seat in the head part, and the cylindrical displacement piston projects with its lower end downwards and slightly beyond the piston rod seal when in its upper stroke stop position. However, the displacement piston can also be flush with the inner end of the piston rod seal in the upper stroke stop position to even further improve cleanability.

In a suitable embodiment, the bottom part is longer than the head part, such that the flange joint is located relatively close to the product inlet.

In view of avoiding dead spaces and promoting the self-emptying and of creating low-turbulence flow conditions, it is suitable for the internal diameter of the head part to gradually decrease in the region of the opening of the product inlet towards the piston rod seal, preferably across a rounded shoulder intersected with the opening of the product inlet, and forms a rounded swelling to be provided adjacent to the seat of the piston rod seal in the intersection of the product inlet with the shoulder, such that in the operating position of the cylinder housing, the inner end of the piston rod seal is, in the region of the intersection, approximately at the level of, or slightly below, the contour of the swelling.

In one embodiment, the product inlet attached to the head part, preferably integral therewith, is a connecting pipe with a starting part approximately vertical in the operating position having a connecting flange for an inlet valve, and with an end part angled with respect to the starting part, the axis of the end part opening into the head part from above including an acute angle with the cylinder axis, preferably of about 45°.

In one embodiment, the product outlet at the lower end of the cylinder housing leads to an outlet valve.

Finally, a seal installed in the flange joint may approximately be flush with the internal diameter of the cylinder housing, or even project from it, such that here, undercut dead spaces are reliably excluded. This seal is not contacted by the displacement piston which moves at a radial distance to the inner wall in the cylinder housing.

BRIEF DESCRIPTION OF THE FIGURES

With reference to the drawing, one embodiment of the subject matter of the invention will be illustrated. In the drawing.

DETAILED DESCRIPTION

Figure 1:
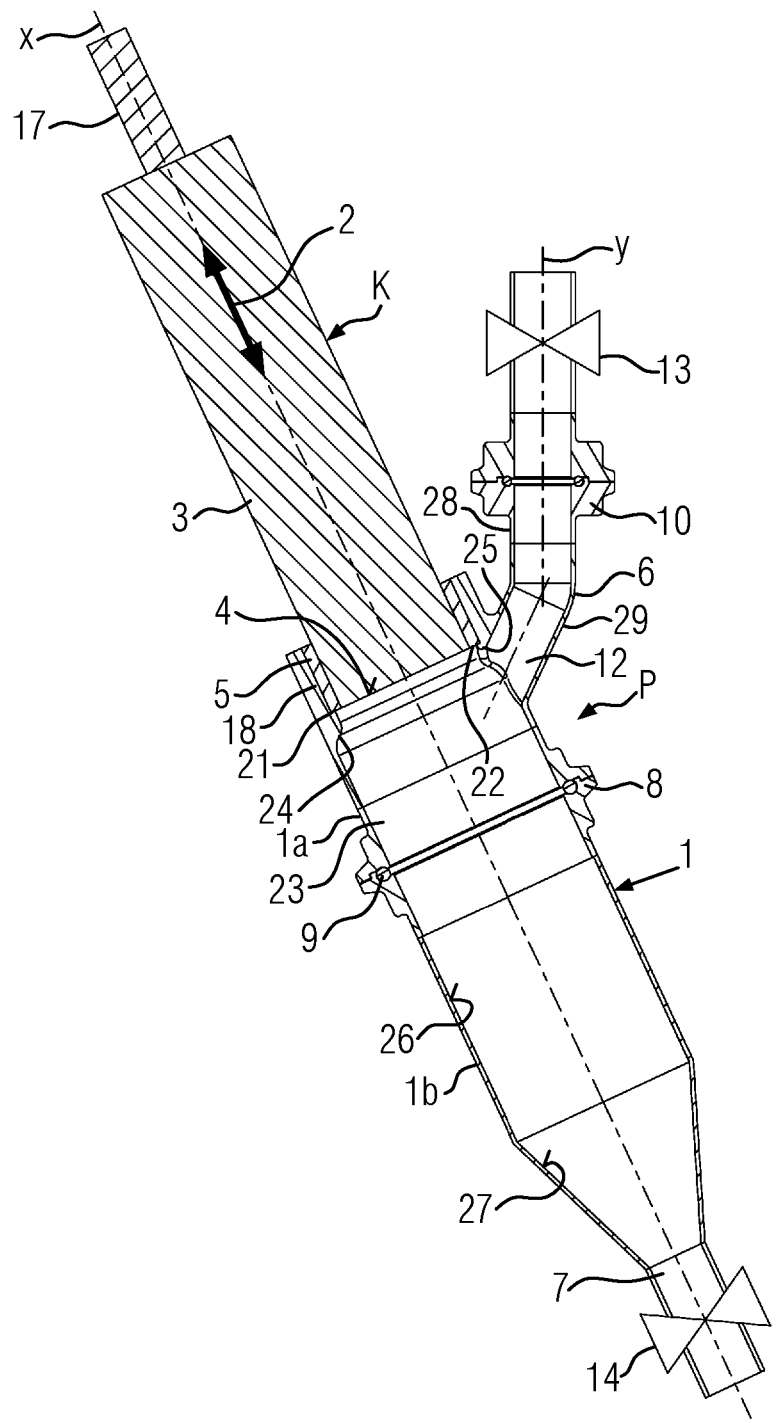
FIG. 1 shows a section of an inventive displacement metering pump in an operating position with a displacement piston in the upper stroke stop position.
Figure 2:
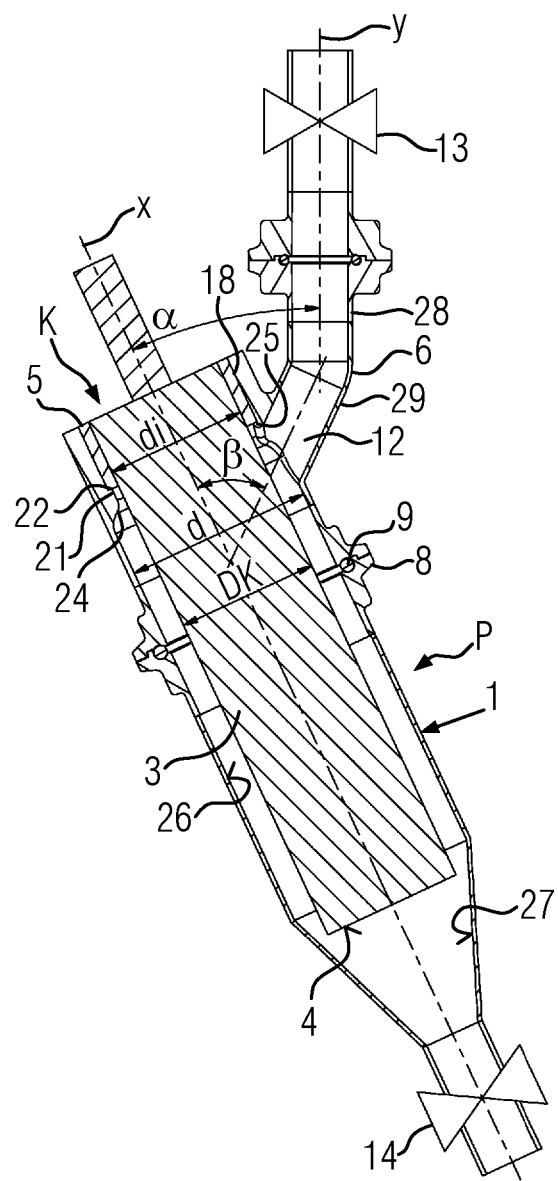
FIG. 2 shows a section of the displacement metering pump in a lower stroke stop position of the displacement piston.

A displacement metering pump P, shown in each of FIGS. 1 and 2 in a section, in particular for the discontinuous volumetric metering of liquid to pasty products which are partially loaded with solid matter, for example in the food industry, can be installed to be inclined with respect to a vertical line in the operating position, e. g. at an angle $\alpha$ of about 30°.

The displacement metering pump P includes, as main components, a tubular cylinder housing 1 as well as a displacement piston K movable within the cylinder housing 1 in the direction of the double arrow 2. The displacement piston K is embodied in its operating area as a circular cylinder and like a piston rod whose end 4 located within the cylinder housing 1 may be planar and essentially perpendicular to the cylinder axis X. The cylinder housing 1 is divided into a head part 1a and a bottom part 1b via a flange joint 8 having a seal 9, here e. g. the bottom part 1b being longer than the head part 1a. In the head part 1a, a piston rod seal 5 is fixedly installed, and a product inlet 6 opens laterally and directly adjacent to the piston rod seal 5 into the head part 1a. The bottom part 1b comprises a cylinder section 26 adjacent to the flange joint 8 which is followed by an outlet funnel 27 towards the lower end of the bottom part 1b leading to an outlet valve 14. Adjacent to the piston rod seal 5, a rounded swelling 25 is provided at the side of the head part 1a at the product inlet 6. The product inlet 6 comprises a flange 10 for connecting an inlet valve 13 which is installed, for example, in an at least essentially vertical position. The angle $\alpha$ at which the cylinder housing 1 is inclined with respect to the vertical line may be about 30°. This angle $\alpha$ is not to be interpreted as limiting, but may also be larger or smaller than 30°.

FIGS. 1 and 2 illustrate the upper stroke stop position of the displacement piston K and the lower stroke stop position of the displacement piston K at a metering stroke. The dose discharged at a metering stroke may be selected by adjusting the lower stroke stop position of the displacement piston K and/or by correspondingly controlling the inlet and outlet valves 13, 14.

The piston rod seal 5 is e.g. a slide bush that is fixedly installed in a fold-like inner seat 18 of the head part 1a, wherein the seat 18 may comprise a shoulder 21 for positioning the piston rod seal 5. In the interior 23 of the head part 1a, the internal diameter d of the head part 1a decreases towards the piston rod seal 5 across a rounded shoulder 24 that passes over into the shoulder 21. On the right side, where the product inlet 6 opens into the head part 1, a rounded swelling 25 is locally provided where the opening 12 of the product inlet 6 is intersected with the head part 1a at its highest point. The product inlet 6 is suitably integrally formed at the head part 1a and has the shape of a connecting pipe with an approximately vertical starting part 28 with the flange 10 (the vertical line is indicated by a dash-dot line Y), and an end part 29 that is angled with respect to the starting part 28 and includes an angle $\beta$ with the cylinder axis X which may be, in the shown embodiment, about 45° without being limited thereto. The swelling 25 is arranged such that the end 22 of the piston rod seal 5 located there (internal diameter di) is at least approximately located at the level of the lowest point of the contour of the swelling 25. The displacement piston K is, for example, driven by a tappet 17 screwed thereto.

The seal 9 in the flange joint 8 can be placed, as shown, (CIP cleanably) as close as possible to the internal diameter d or be flush therewith, or even project since the diameter DK of the displacement piston K is smaller than the diameter d in the head part 1a and the cylinder housing 1, such that the displacement piston K may easily traverse the flange joint 8.

If, for example, after a predetermined period of use of the displacement metering pump P or for a product change, a cleaning cycle has to be performed (CIP cleaning), the cleaning medium is conveyed under pressure from the product inlet 6 down to and through the product outlet 7. All surfaces in the displacement metering pump P contacted by the product may be hygienically flawlessly cleaned corresponding to the strict stipulations for food machines since the displacement metering pump P has no dead space and is self-emptying. Everything will drain with the cleaning medium in a clean manner and without any residues.

An essential advantage of this concept of the displacement metering pump is, from the user's point of view, that it may not only be used for hot metering, but surprisingly also for cold metering.

Metering accuracy remains high since there are no dead spaces retaining an air cushion.

The invention claimed is:

1. A displacement metering pump, for a discontinuous volumetric metering of liquid to pasty products that are partially loaded with solid matter, comprising:
a cylinder housing, which has a product inlet in an upper end and a product outlet in a lower end, installed in an essentially vertical operating position whereby the upper end and the lower end are connected to one another such that the upper end is positioned vertically above the lower end, and in which a sealed displacement piston is movable back and forth between an upper stroke stop position within the upper end and a lower stroke stop position within the lower end;
wherein the cylinder housing, with a piston rod seal fixedly installed therein for the sealed displacement piston that is formed as a piston rod having a circular cylindrical shape at least over an operating length between the upper stroke stop position and the lower stroke stop position and having a piston rod end exposed to an interior space within the cylinder housing, has no dead space or space that would permit an air cushion when the piston rod end is at the upper stroke stop position and when the cylinder housing is in the essentially vertical operating position;
wherein the cylinder housing is self-emptying;
wherein in the essentially vertical operating position, the product inlet is placed at a top of the upper end and the product outlet is placed at a bottom of the lower end, such that at least the cylinder housing and the sealed displacement piston immersing into the cylinder housing from above permits cleaning with respect to CIP hygiene via the product inlet and the product outlet;
wherein the product inlet is arranged laterally in the upper end of the cylinder housing and the product inlet is positioned directly adjacent to the piston rod seal;
wherein the piston rod seal is a slide bush fixed in a seat in the upper end of the cylinder housing;
wherein the piston rod end projects, in the upper stroke stop position, slightly beyond the piston rod seal into the interior space of the cylinder housing, or is flush with the piston rod seal; and
wherein a diameter of the sealed displacement piston is smaller than an internal diameter of the cylinder housing such that the sealed displacement piston does not contact an inner wall of the cylinder housing and a radial distance between the sealed displacement piston and the inner wall of the cylinder housing is provided.

2. The displacement metering pump according to claim 1, wherein the diameter of the sealed displacement piston is smaller than the internal diameter of the cylinder housing, at least in the upper end of the cylinder housing.

3. The displacement metering pump according to claim 1, wherein the liquid to pasty products that are partially loaded with solid matter is unheated.

4. The displacement metering pump according to claim 1, wherein a cylinder axis of the cylinder housing is inclined with respect to a vertical line in the essentially vertical operating position, such that the product inlet intersects the interior space of the cylinder housing at a highest point of the interior space of the cylinder housing proximate to the piston rod end at the upper stroke stop position.

5. The displacement metering pump according to claim 1, wherein the product inlet is integrally formed as a connecting pipe having a starting part which is approximately vertical in the essentially vertical operating position, with a connecting flange for an inlet valve, and an end part angled with respect to the starting part, wherein an axis of the end part opening into the interior space of the cylinder housing within which the piston rod end is movable from the upper stroke stop position, forms an acute angle with a cylinder axis of the cylinder housing.

6. The displacement metering pump according to claim 5, wherein the acute angle is 45°.

7. The displacement metering pump according to claim 1, wherein the cylinder housing is divided, by a sealed flange joint, into a head part comprising the upper end having the piston rod seal and the product inlet, and a coaxial bottom part comprising the lower end having a cylinder section and a terminal outlet funnel opening into the product outlet.

8. The displacement metering pump according to claim 7, wherein an annular seal installed in the sealed flange joint is approximately flush with the internal diameter of the cylinder housing.

9. The displacement metering pump according to claim 7, wherein an internal diameter of the head part gradually decreases in a region of an opening of the product inlet towards the piston rod seal, wherein a rounded swelling is provided adjacent to the seat of the piston rod seal in an intersection of the product inlet with the interior space of the cylinder housing within which the piston rod end is movable from the upper stroke stop position, and wherein, in the essentially vertical operating position of the cylinder housing, an inner end of the piston rod seal is vertically positioned approximately at or slightly below the rounded swelling.

10. The displacement metering pump according to claim 7, wherein the terminal outlet funnel comprises a tapered funnel positioned at least partially between the cylinder section within which the piston rod end is movable toward the upper stroke stop position and the product outlet.

11. A displacement metering pump, for a discontinuous volumetric metering of liquid to pasty products that are partially loaded with solid matter, comprising:
a cylinder housing, which has a product inlet in an upper end and a product outlet in a lower end, installed in an essentially vertical operating position whereby the upper end and the lower end are connected to one another such that the upper end is positioned vertically above the lower end, and in which a sealed displacement piston is movable back and forth between an upper stroke stop position within the upper end and a lower stroke stop position within the lower end;
wherein the cylinder housing, with a piston rod seal fixedly installed therein for the sealed displacement piston that is formed as a piston rod having a circular cylindrical shape at least over an operating length between the upper stroke stop position and the lower stroke stop position and having a piston rod end exposed to an interior space within the cylinder housing, has no dead space or space that would permit an air cushion when the piston rod end is at the upper stroke stop position and when the cylinder housing is in the essentially vertical operating position;
wherein the cylinder housing is self-emptying;
wherein in the essentially vertical operating position, the product inlet is placed at a top of the upper end and the product outlet is placed at a bottom of the lower end, such that at least the cylinder housing and the sealed displacement piston immersing into the cylinder housing from above permits cleaning with respect to CIP hygiene via the product inlet and the product outlet;
wherein the product inlet is arranged laterally in the upper end of the cylinder housing and the product inlet is positioned directly adjacent to the piston rod seal;

wherein the upper end and the lower end are connected via a sealed flange joint with an inserted seal, the inserted seal comprising an annular seal having an inner diameter that is approximately flush with an internal diameter of the interior space within the cylinder housing such that undercut dead spaces at the annular seal are excluded; and wherein a diameter of the sealed displacement piston is smaller than an internal diameter of the cylinder housing such that the sealed displacement piston does not contact an inner wall of the cylinder housing and a radial distance between the sealed displacement piston and the inner wall of the cylinder housing is provided.

12. The displacement metering pump as in claim 11, wherein a cylinder axis of the cylinder housing is inclined at an angle of 30° with respect to a vertical line in the essentially vertical operating position of the displacement metering pump.

* * * * *